United States Patent [19]
Petersen et al.

[11] Patent Number: 5,802,051
[45] Date of Patent: Sep. 1, 1998

[54] MULTIPLEXING OF VOICE AND DATA MINICELLS

[75] Inventors: Lars-Göran Petersen, Tumba; Lars Göran Wilhelm Eneroth, Tyresö, both of Sweden

[73] Assignee: Telefonaktiebolaget LM Ericsson, Stockholm, Sweden

[21] Appl. No.: 660,824

[22] Filed: Jun. 10, 1996

[51] Int. Cl.$^6$ ..................................................... H04J 3/24
[52] U.S. Cl. ........................... 370/395; 370/473; 370/474; 370/537
[58] Field of Search ..................... 370/349, 394, 370/392, 389, 391, 395, 412, 418, 468, 469, 471, 473, 474, 476, 537, 538

[56] References Cited

U.S. PATENT DOCUMENTS

| | | | |
|---|---|---|---|
| 5,481,544 | 1/1996 | Baldwin et al. | 370/392 |
| 5,541,919 | 7/1996 | Yong et al. | 370/416 |
| 5,557,608 | 9/1996 | Calvignac et al. | 370/389 |
| 5,563,884 | 10/1996 | Fimoff et al. | 370/391 |
| 5,625,625 | 4/1997 | Oskouy et al. | 370/395 |

FOREIGN PATENT DOCUMENTS

WO 95/33309 12/1995 WIPO.

OTHER PUBLICATIONS

"B–ISDN ATM Adaption Layer (AAL) Type 5 Specification", ITU–T Recommendation I.363.5, 1996.
Zsehong Tsai et al. "Performance Analysis of Two Echo Control Designs in ATM Networks", 8426 IEEE/ACM Transactions of Networking vol. 2, No. 1, Feb. 1, 1994, pp. 30–39, New York, USA.
Hitoshi Uematsu et al. "Implementation and Experimental Results of CLAD Using SRTS Method in ATM Networks", Proceeding of the Global Telecommunication Conference (Globecom), San Francisco, Nov. 28–Dec. 2, 1994, IEEE, pp.1815–1821.

*Primary Examiner*—Hassan Kizou
*Attorney, Agent, or Firm*—Burns, Doane, Swecker & Mathis, L.L.P.

[57] ABSTRACT

Segmenting, multiplexing and transporting user data packets in a telecommunication system that employs Asynchronous Transfer Mode can be accomplished more effectively by assigning a transmission priority code to each segmented user data packet based on the type of data contained therein. Data that is highly sensitive to transmission delays (e.g., voice data) will be assigned a high priority, while data that is less sensitive to transmission delays (e.g., signal strength measurement data) will be assigned a lower priority. When the user data packet segments are assembled into segment minicells and multiplexed into the ATM cell stream, those with the highest priority will be inserted first so that they experience the least amount of transmission delay.

20 Claims, 9 Drawing Sheets

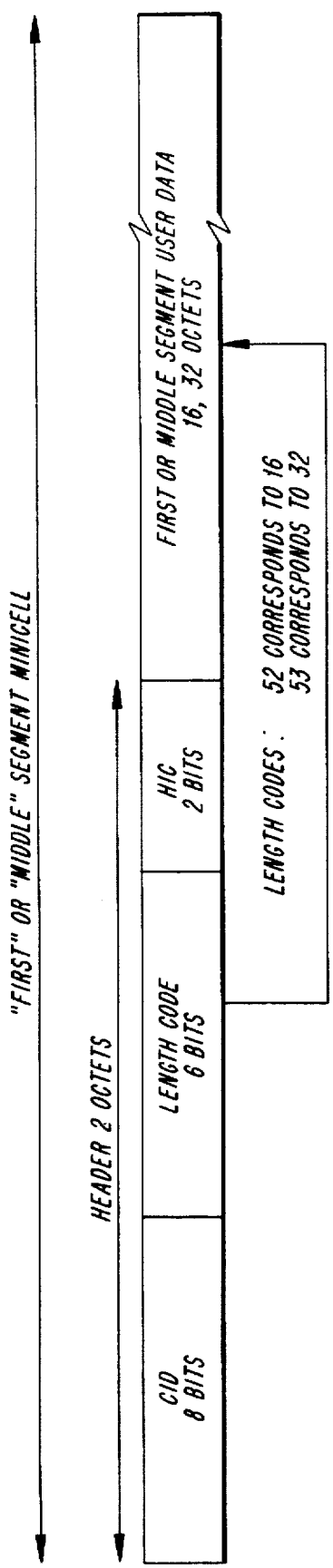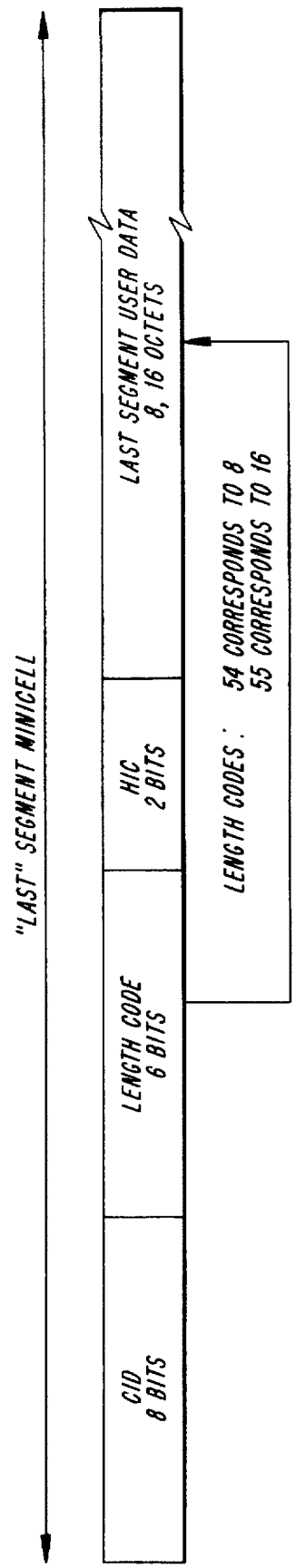

MULTIPLEXING OF VOICE AND DATA MINICELLS

BACKGROUND

The present invention relates to telecommunication systems which employ Asynchronous Transfer Mode (ATM) to transmit both voice-type data and other types of data over the same ATM connection. More particularly, the present invention relates to a method and apparatus for distinguishing between voice-type data and other types of data and multiplexing the different types of data simultaneously on the same ATM connection.

Asynchronous Transfer Mode (ATM) is a standard protocol for transmitting telecommunication data within a telecommunication system (e.g., a cellular telecommunication system). Data is transmitted from a transmission station to a receiving station in fixed-size data packets called ATM cells. Each ATM cell contains 53 octets, including a 48 octet payload and a 5 octet header. ATM is well known in the art and is commonly used to transport high bit rate data (e.g., multimedia data). However, ATM can be used for low bit rate data applications as well (e.g., cellular voice communication).

In general, when used to transport user data for low bit rate data applications, ATM does not efficiently utilize the available bandwidth which is very expensive. To illustrate, voice data is compressed into data packets. Each data packet is then stored in the payload of an ATM cell before the ATM cell is transported from a transmission station (e.g., a cellular base station) to a receiving station (e.g., a cellular mobile switching center). While each data packet ranges in length from a few octets to about 20 octets, the length of the ATM cell payload is much larger (48 octets). Since each ATM cell carries but one data packet, a substantial portion of the ATM cell payload remains empty during transmission which is extremely inefficient as well as cost ineffective.

To improve the utilization of available bandwidth when ATM is used in conjunction with a low bit rate data application, an ATM adaption layer 100 (AALm) was introduced, as illustrated in FIG. 1. The AALm 100 has two primary sublayers: the assembly and disassembly sublayer 102 (AAD) and the multiplexing and demultiplexing sublayer 103 (MAD). The AALm 100 operates as follows. The AAD sublayer 102 inserts the low bit rate data into small data packets called minicells at a telecommunication system transmission station (e.g., a base station). The MAD sublayer 103 then multiplexes as many minicells as possible into the payload of each ATM cell before the ATM cell is transported to a receiving station (e.g., a mobile switching center). At the receiving station, the MAD sublayer 103 demultiplexes (i.e., separates) the minicells and the AAD sublayer 102 extracts the low bit rate data from the minicells. Since each ATM cell transports more than one data packet simultaneously (i.e., more than one minicell), the utilization of available bandwidth is significantly improved.

Despite the fact that ATM with AALm achieves better bandwidth utilization than ATM without AALm, other problems arise when the minicells tend to be excessively long, for example, minicells with a data portion that is longer than a predefined length (e.g., the length of an ATM cell payload). First, excessively large minicells tend to introduce large transmission delay variations. These delay variations typically manifest themselves as "jitter" in the telecommunication signal. To avoid jitter, a system must add a delay variation factor to a fixed delay, resulting in larger overall transmission times. Removing jitter is a complicated process and generally requires very expensive equipment. Moreover, low bit rate data applications, such as voice communication, are particularly susceptible to the degenerative effects of jitter.

To correct the problem caused by excessively long minicells, an updated version of the AALm 100 is illustrated in FIG. 2. AALm 200 in FIG. 2 includes a Segmentation and Reassembly (SAR) sublayer 201. At the transmission station, the SAR sublayer 201 segments excessively long user data packets before the AAD sublayer 202 inserts the segmented user data packets into shorter bandwidth efficient minicells. At the receiving station, the SAR sublayer 201 reassembles the segmented user data, as the name suggests, after the AAD sublayer 202 extracts the user data from the minicells.

U.S. patent application Ser. No. 08/630,578 describes a method for segmenting excessively large user data packets as illustrated in FIG. 3. First, the SAR sublayer 201 segments the user data packet 305 into a number of segments. Each segment, except the last segment, has a predefined length. The predefined length may be, for example, 8, 16, 32, or 46 octets. In FIG. 3, the predefined length for each segment (except for the last segment) is 16 octets. The length of the last segment, however, reflects the remaining portion of the user data packet 305, rounded to the nearest octet. Next, the AAD sublayer inserts each segment into a minicell with an appropriate header.

U.S. patent application Ser. No. 08/630,578 also describes the minicell protocols 400 and 450 illustrated in FIGS. 4A and 4B, respectively. In accordance with protocol 400/450, each minicell is divided into a header portion 401/451, and a payload portion 402/452. The header is further divided into the following fields: a connection identifier (CID) code 405/455, a length code 410/460, and a header integrity check (HIC) code 415/465. The CID code 405/455 identifies the specific connection associated with the minicell (e.g., a particular cellular telephone call). The HIC code 410/460 is an error detection code. The length field 410/460 comprises 6 bits; therefore, 64 code combinations are possible. The length field 410/460 provides a means for distinguishing between a first or middle segment minicell, as illustrated in FIG. 4A, and a last or single segment minicell (i.e., a minicell corresponding to a user data packet that is 46 octets in length or less), as illustrated in FIG. 4B. The length code also provides a means for defining 1 of 46 variable minicell lengths for a last or single minicell, as illustrated in FIG. 4B, and a means for defining 1 of 4 fixed lengths for a first or middle segment minicell, as illustrated in FIG. 4A. Therefore, the length field contains all of the data necessary for the SAR sublayer 301 to reassemble the user data segments at the receiving station.

FIG. 5 illustrates how segmented and unsegmented data packets are transported between telecommunication system end stations over a single minicell connection. Note, user data packet "a" 501 arrives at the SAR sublayer 201 first. Although FIG. 5 does not reflect the actual length of user data packet "a" 501, user data packet "a" 501 is sufficiently long to warrant segmentation. The SAR sublayer 201 then proceeds to segment user data packet "a" 501 into 3 segments. The AAD sublayer 202 then inserts each segment into separate minicells 1a, 2a, and 3a. Also note, user data packet "b" 502 arrives at the SAR sublayer 201 after user data packet "a" 501, but well before the SAR sublayer 201 and the AAD sublayer 202 have segmented user data packet "a" 501 and inserted each of the segments into minicells 1a, 2a, and 3a. Therefore, the user data packet "b" 502 will not be inserted into a minicell b until each of the segments associated with user data packet "a" 501 have been inserted into minicells 1a, 2a, and 3a.

FIG. 5 illustrates that a significant problem exists with the way ATM has been implemented when used in conjunction with low bit rate data applications, specifically when the application involves more than one ongoing session (i.e., the application generates more than one type of data). For example, one session may involve the generation and transportation of control data (e.g., data relating to power regulation or signalling that controls "handoff" between base stations) or non-voice user data such as facsimile data. This data may be represented by user data packet "a" 501. Another session may involve the generation and transportation of voice data. This data may be represented by user data packet "b" 502. Because the SAR sublayer 201 and the AAD sublayer 202 can only process one user data packet at a time, as explained above, the voice data associated with user data packet "b" 502 must wait until all of the data associated with user data packet "a" 501 has been inserted into minicells. This holds true despite the fact that voice data typically has a much higher transmission priority than other types of related data (i.e., voice data is much more sensitive to transmission delays).

Further complicating the problem is the fact that the MAD sublayer 203 may have to multiplex minicells generated by more than one AAD sublayer 202, that is, AAD sublayers associated with secondary or tertiary applications. Because the MAD sublayer 203 operates on a "first-in-first-out" (FIFO) basis, data packets containing voice data must compete with data packets being generated by the same application as well as data packets being generated by other applications operating in parallel.

Prior methods that use ATM for low bit rate data applications, even those that employ AALm, clearly do not distinguish between segment minicells with different transmission priority requirements.

SUMMARY

The present invention overcomes this deficiency by providing an improved AALm that takes transmission priority into consideration when generating and multiplexing segment minicells into the ATM cell stream.

It is an object of the present invention to assign a transmission priority to each segment minicell.

It is another object of the present invention to multiplex segment minicells from various user data packets into the ATM cell stream in order of transmission priority.

It is yet another object of the present invention to provide a segmentation process that makes it possible to utilize an existing minicell header code for transmission priority, thereby providing the transmission priority without detrimentally effecting bandwidth utilization.

In accordance with one aspect of the invention, the foregoing and other objects are achieved by a method and/or an apparatus for multiplexing segmented user data packets into a stream of data cells prior to transmission from a sending station to a receiving station, the method comprising the steps of: dividing a user data packet into segments; assigning a transmission priority code to each segment based on a type of data associated with the user data packet; and multiplexing the segments into the stream of data cells with at least one segment from another user data packet as a function of transmission priority, wherein said segments are interleaved relative to one another as a function of transmission priority.

In accordance with another aspect of the invention, the foregoing and other objects are achieved by a method and/or an apparatus for multiplexing segmented user data packets into a stream of data cells prior to transmission from a sending station to a receiving station, the method comprising the steps of: retrieving a user data packet from one of a select number of telecommunication applications serviced by said telecommunication system, wherein said telecommunication application generates a plurality of different data types; dividing the user data packet into segments according to the length of said user data packet and the type of data associated with said user data packet; providing a corresponding minicell for each segment of the user data packet; assembling each of the segments of said user data packet into a payload portion of the corresponding minicell; attaching to each minicell, a minicell header containing a code that identifies a transmission priority associated with a type of data contained in the segment; and multiplexing the minicells into a stream of data cells with minicells associated with other user data packets from the same telecommunication application for transmission to a receiving station, wherein the order in which the minicells are multiplexed is a function of transmission priority.

BRIEF DESCRIPTION OF THE DRAWINGS

The objects and advantages of the present invention will be understood by reading the following detailed description in conjunction with the drawings in which:

FIGS. 7A and 7B illustrate exemplary protocols for segment minicells;

DETAILED DESCRIPTION

The present invention is capable of simultaneously multiplexing more than one user data packet on a single minicell connection as a function of transmission priority. As explained above, prior methods employ a FIFO operation that sequentially multiplexes the user data packets, one after the other, without taking transmission priority into consideration.

Figure 1:
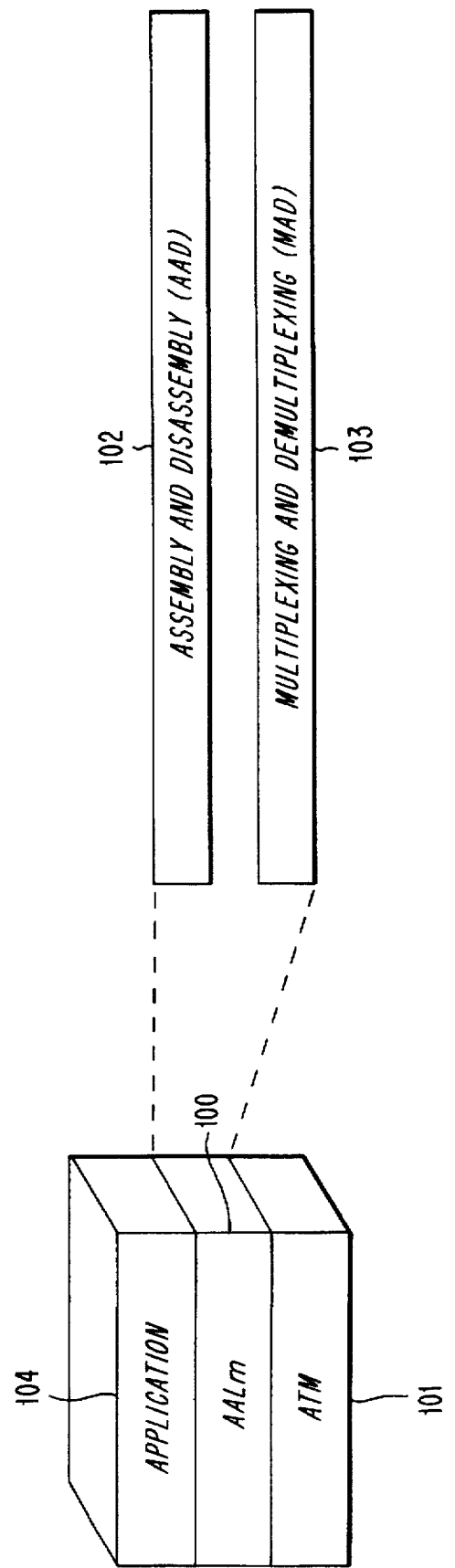
FIG. 1 is a block diagram illustrating a prior ATM system that incorporates an ATM adaption layer (AALm)
Figure 2:
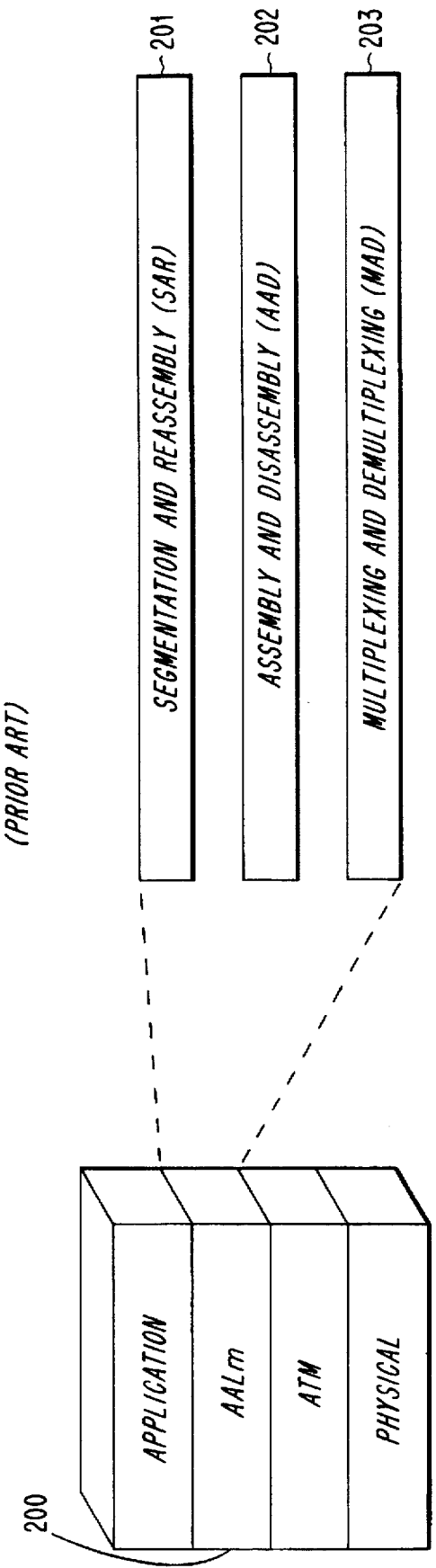
FIG. 2 is a block diagram illustrating a prior ATM system that incorporates an AALm that includes a segmentation and reassembly sublayer.
Figure 3:
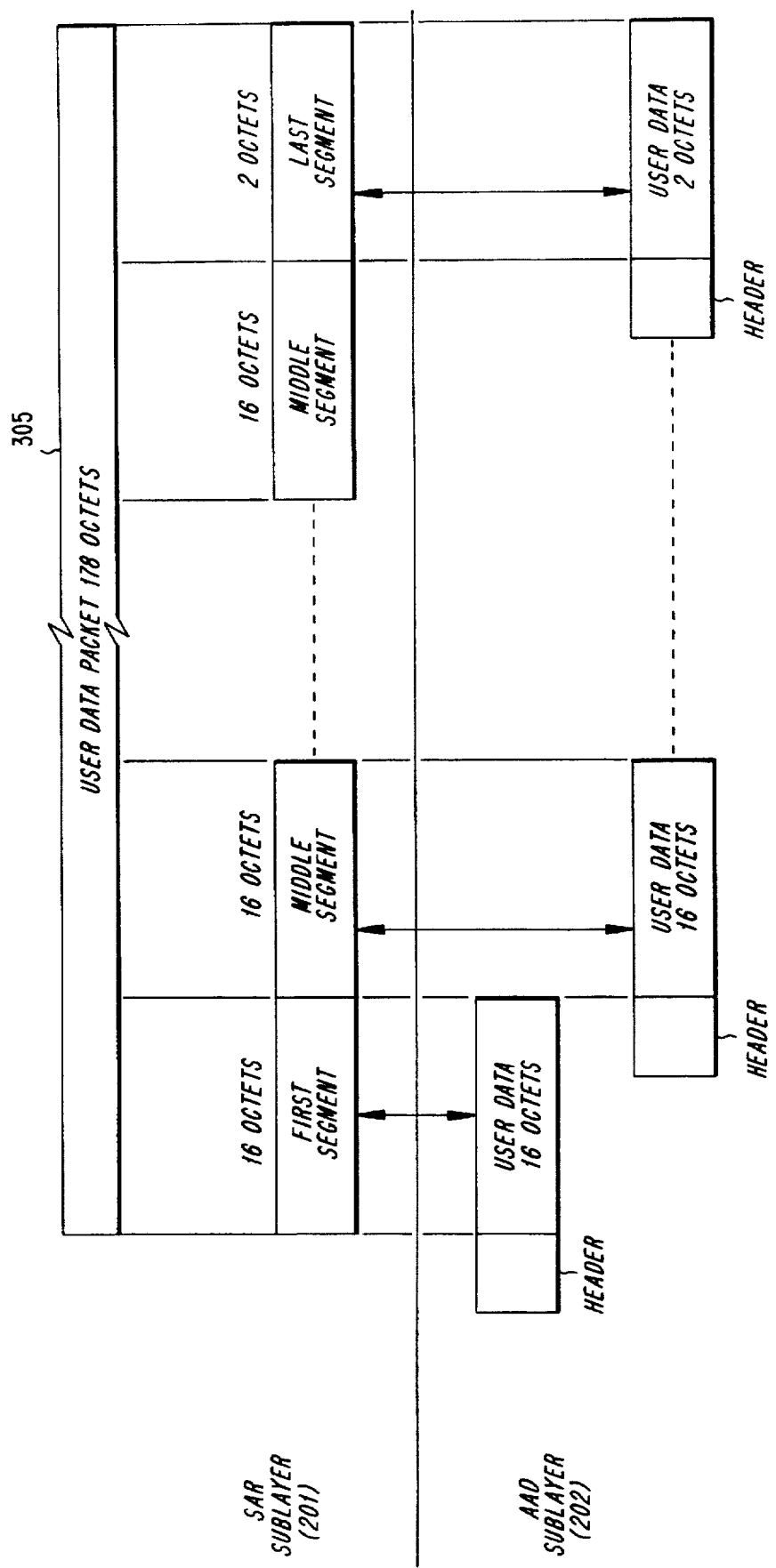
FIG. 3 depicts a prior method for segmenting user data packets.
Figure 4A:
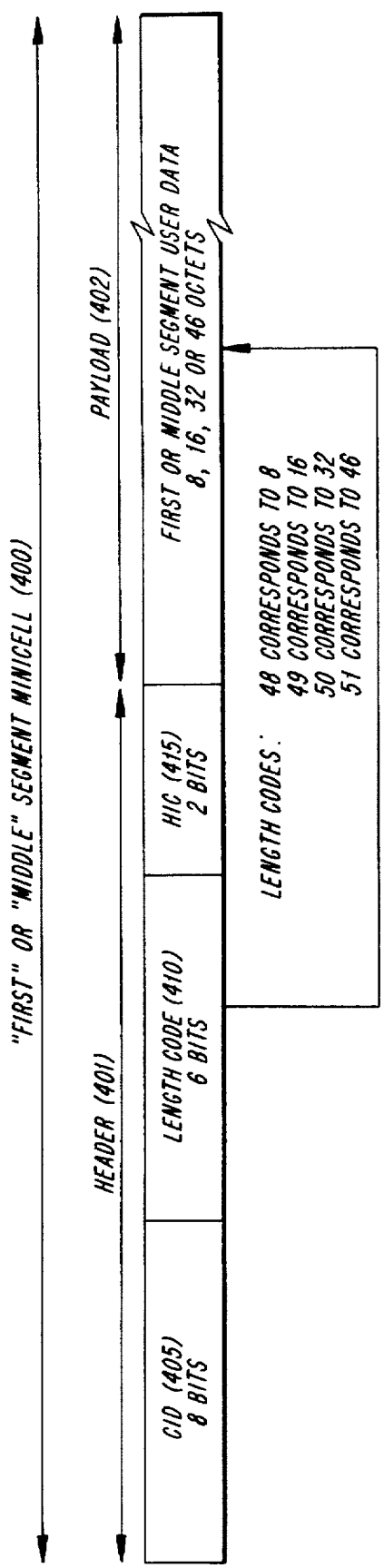
FIGS. 4A and 4B illustrate prior protocols for segment minicells.
Figure 4B:
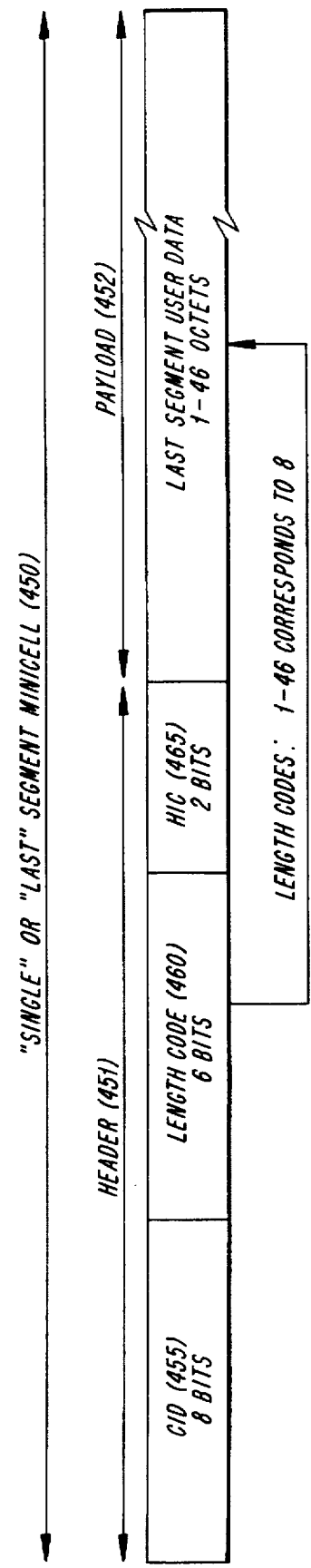
Figure 5:
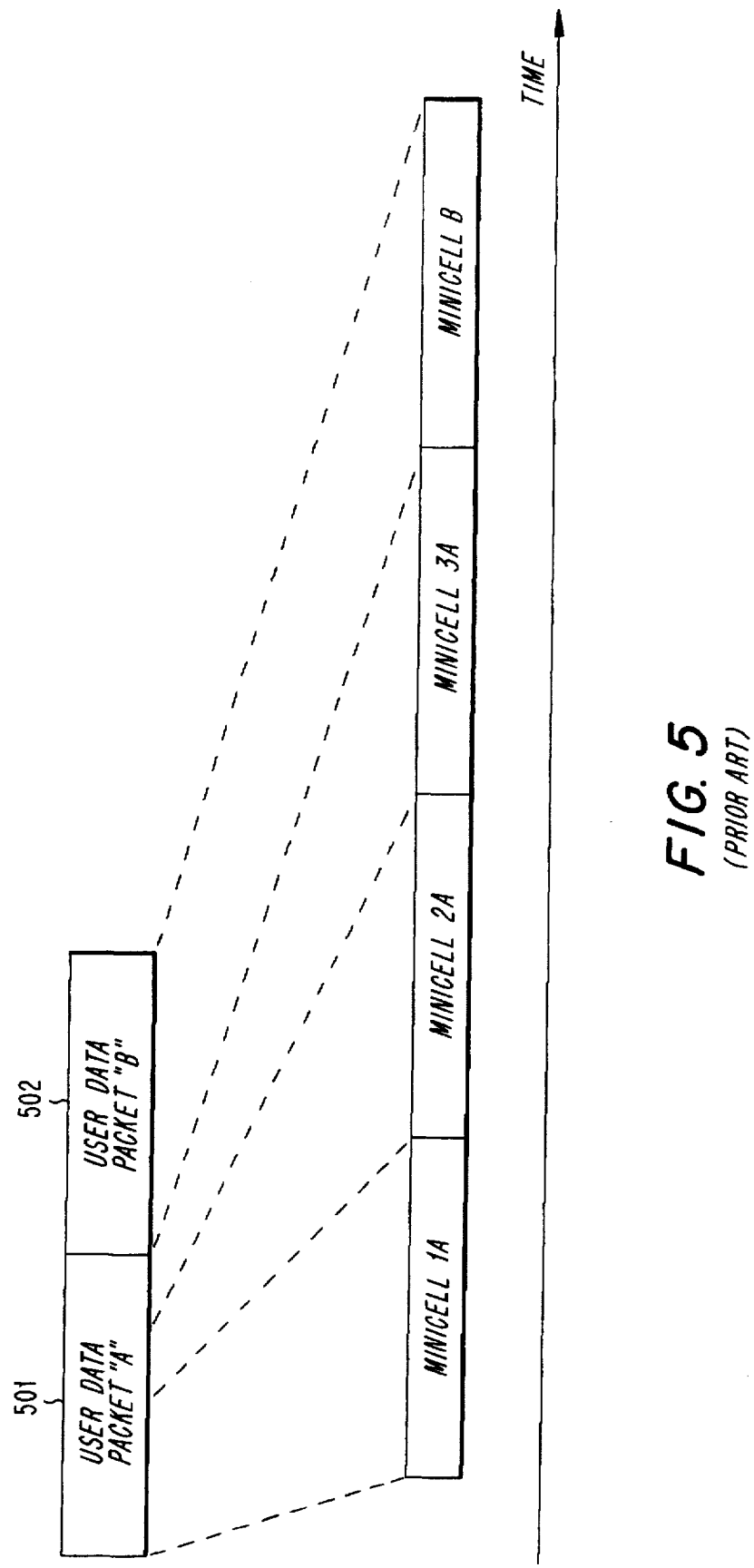
FIG. 5 illustrates the multiplexing of segment minicells when transmission priority is not taken into account.
Figure 6:
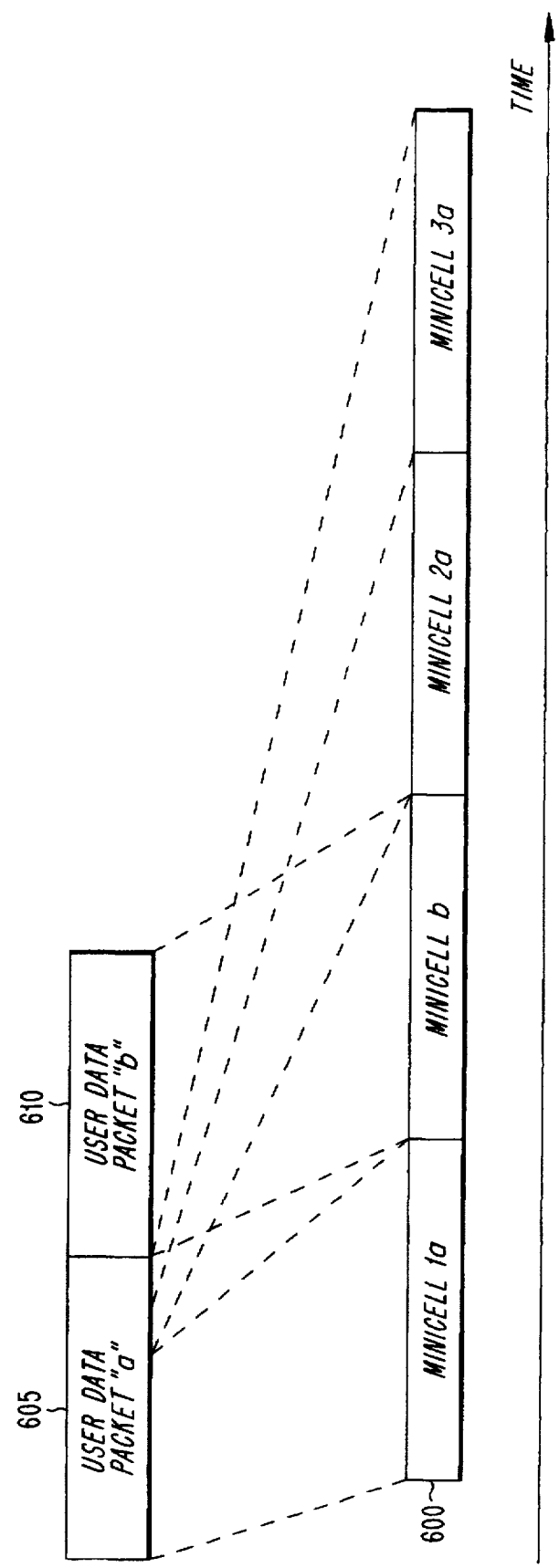
FIG. 6 illustrates the multiplexing of segment minicell when transmission priority is taken into account.

FIG. 6 illustrates the minicell transmission sequence 600 that results when the present invention is used to segment, assemble, and multiplex user data packet "a" and user data packet "b" first depicted in FIG. 5. As before, user data packet "a" 605 arrives at the AALm before user data packet "b" 610. The SAR sublayer immediately begins to divide user data packet "a" 305 into three segments. The AAD sublayer then begins assembling the three segments into minicells 1a, 2a, and 3a respectively, and the MAD sublayer 203 begins multiplexing the minicells 1a, 2a, and 3a into the ATM cell stream for transmission. However, before minicell 2a has been fully segmented, assembled, and multiplexed, user data packet "b" 610 arrives at the AALm, wherein user data packet "b" 610, for the purpose of illustration, has a higher transmission priority than user data packet "a" 605. Unlike the prior method, the AALm recognizes, as will be explained in more detail below, that user data packet "b" 610 has a higher priority and immediately interrupts the processing of user data packet "a" 605 until user data packet "b" has been segmented, if necessary, assembled into a minicell b, and multiplexed into the ATM stream for transmission. Once this has been accomplished, the AALm will complete the processing of user data packet "a" 605, assuming that no additional user data packets with a higher priority have arrived.

The minicell transmission sequence 600 clearly reflects a different result compared to the transmission sequence achieved by the prior method illustrated in FIG. 5. The fact that the present invention multiplexes minicell b into the ATM cell stream ahead of minicell 2a and minicell 3a means that the voice data contained in the payload of minicell b will arrive at the receiving station much faster than it would have been received had the prior method been employed. This ultimately results in less transmission delay, less transmission jitter, and an overall better voice signal quality.

The present invention simultaneously multiplexes more than one user data packet on a single minicell connection as a function of transmission priority by employing a predefined transmission priority assignment schedule (see TABLE 1 below) and by providing a modified user data packet segmentation process that takes advantage of the fact that the conventional method does not use all 64 possible length code combinations to define segment position (i.e., first segment, middle segment, last segment) and segment length.

As mentioned, the present invention relies on a predefined transmission priority assignment schedule. TABLE 1 provides an example of a transmission priority schedule that might be used in conjunction with a cellular application. In accordance with this priority schedule, user data packets will fall into one of five different priority categories, wherein, a priority of "1" represents the highest transmission priority and a priority of "5" represents the lowest transmission priority. In order of transmission priority, the five categories presented in the exemplary embodiment are as follows: voice data; circuit data; power measurement data; control data (e.g., handoff signals); and other data. Of course, the selection of categories and the assignment of their relative priorities are not limited to those illustrated here, but will instead depend on the particular application.

In accordance with the conventional method, the length code is used to define the length of each segment and the relative position of each segment (i.e., whether the segment is a first, middle, or last segment). To accomplish this, the conventional method used essentially 51 of the 64 possible length code combinations (the length code in a typical minicell header protocol is allocated 6 bits).

As stated above, the present invention takes advantage of the fact that there are 13 unused length code combinations. As TABLE 1 illustrates, these 13 previously unused length code combinations may be used by the present invention to define not only the length and relative position of each segment, but also the transmission priority of the corresponding user data packet. For example, codes 52, 53, 54, and 55 are used to identify segment minicells associated with priority category "2", circuit data. Code 56 is used to identify segment minicells associated with priority category "3", power measurement data. Codes 57, 58, and 59 are used to identify segment minicells associated with priority category "4", control data. Codes 60, 61, 62, and 63 are used to identify segment minicells associated with priority category "5", other data.

TABLE 1

Code and delay priority assignment example

| segmentation method | first/middle segment minicell | | last/single segment minicell | | application | |
|---|---|---|---|---|---|---|
| | length code | payload length octets | length code | payload length octets | delay priority | usage |
| prior art | 48, 49, 50, 51 | 8, 16, 32, 46 | 1–46 | 1–46 respectively | 1 | voice packets |
| Invention | 52, 53 | 16, 32 | 54, 55 | 8, 16 | 2 | circuit data (e.g. fax, voice related video) |
| | — | — | 56 | 8 | 3 | power measurement (note: only single segment allowed) |
| | 57, 58 | 16, 32 | 59 | 8 | 4 | control |
| | 60, 61 | 16, 32 | 62, 63 | 8, 16 | 5 | data packets |

FIGS. 7A and 7B further illustrate how the length codes in the header of each segment minicell are used to define not only the length and relative position of each segment minicell, but also the transmission priority of the corresponding user data packet. Referring first to FIG. 7A, the length code 52 or 53 indicates that a) the segment minicell is a first or middle segment minicell, b) the segment minicell is 16 octets or 32 octets in length respectively; and c) the segment minicell is associated with a user data packet belonging to transmission priority category "2", circuit data. Referring next to FIG. 7B, the length code 54 or 55 indicates that a) the segment minicell is a last segment minicell, b) the segment minicell is 8 octets or 16 octets in length respectively; and c) the segment minicell is associated with a user data packet belonging to transmission priority category "2", circuit data.

FIG. 7B also illustrates another aspect of the invention in which a somewhat different protocol is employed to define the last segment of user data packets associated with transmission priority categories "2" through "5" than is utilized in prior art methods. More specifically, FIG. 7B illustrates that a last segment minicell associated with transmission priority category "2" is limited to a fixed length of either 8 or 16 octets. Similarly, the last segment minicells associated with the other transmission priority categories other than category "1" are also limited to one or two fixed lengths. By contrast, in prior art methods, the last segment minicell could take on any length, essentially limited only by the length of the ATM cell payload. Because it is desirable for the inventive segmenting technique to be compatible with prior art techniques with respect to providing category "1"-type data packets, a preferred embodiment of the invention allows the length of a last segment minicell associated with transmission priority category "1" to vary from just 1 octet to 46 octets.

The reason that the length of last segment minicells associated with transmission priority categories "2" through "5" is limited in the illustrative embodiment is because the number of available length codes is limited. However, one skilled in the art will readily understand that the length code assignments presented in TABLE 1 are exemplary, and that the assignments could be rearranged to accommodate greater flexibility in defining the length of last segment minicells associated with transmission priority categories "2" through "5". Furthermore, one skilled in the art will recognize that allocating additional bits to the length field will also accommodate greater flexibility in defining the length of last segment minicells as well as additional transmission priority categories.

Given a 6 bit length field and the limited number of available length code combinations, as explained above, the present invention provides a modified user data packet segmentation process for user data packets associated with transmission priority categories "2" through "5". This modified segmentation process is described hereinbelow.

Figure 8:
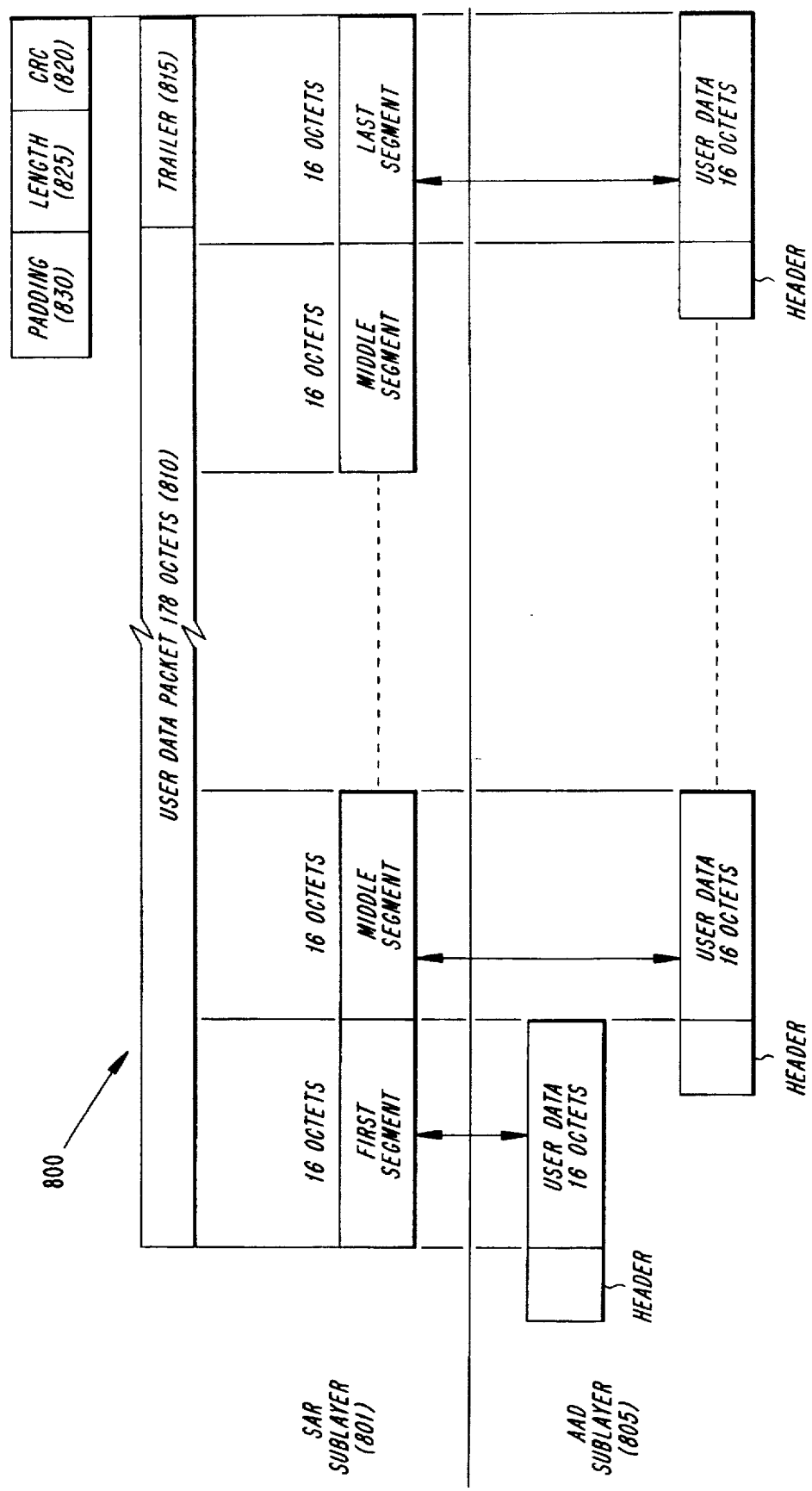
FIG. 8 illustrates an exemplary method for segmenting user data packets.

FIG. 8 illustrates an exemplary segmentation method 800 to be executed, in accordance with the present invention, by the SAR sublayer 801 and the AAD sublayer 805 on a user data packet 810, which is associated with transmission priority category "2", "3", or "4". After the user data packet 810 arrives at the SAR sublayer 801, the SAR sublayer 801 extends the length by a certain number of octets. The extension is depicted by the trailer 815.

Trailer 815 is employed so that the last segment of user data packet 810, when segmented by the SAR sublayer 801, is equal to one of the limited number of lengths available for the corresponding transmission priority category. For example, user data packet 810 is 178 octets in length. It is divided by the SAR sublayer 801 into a 16 octet first segment, ten 16 octet middle segments, and a 2 octet last segment. Assume, for illustrative purposes, that user data packet 810 contains circuit data (i.e., transmission priority category "2"). Then the minicell header for the first and middle segment minicells should contain the length code 52 (refer to TABLE 1). However, there is no length code available for a last segment minicell associated with transmission priority category "2" with a length of 2 octets. Therefore a trailer 815 is added to the user data packet 810, as explained above, so the minicell corresponding to the last segment will be 16 octets long and contain a length code of 55 (refer to TABLE 1).

As illustrated in FIG. 8, the trailer 815 contains an error detection field 820 that may, for example, contain a cyclic redundancy code (CRC) or parity bits; a length field 825; and a padding portion 830. It is the padding portion 830 that is used to extend the last segment of user data packet 810 to a length of 16 octets.

Figure 9:
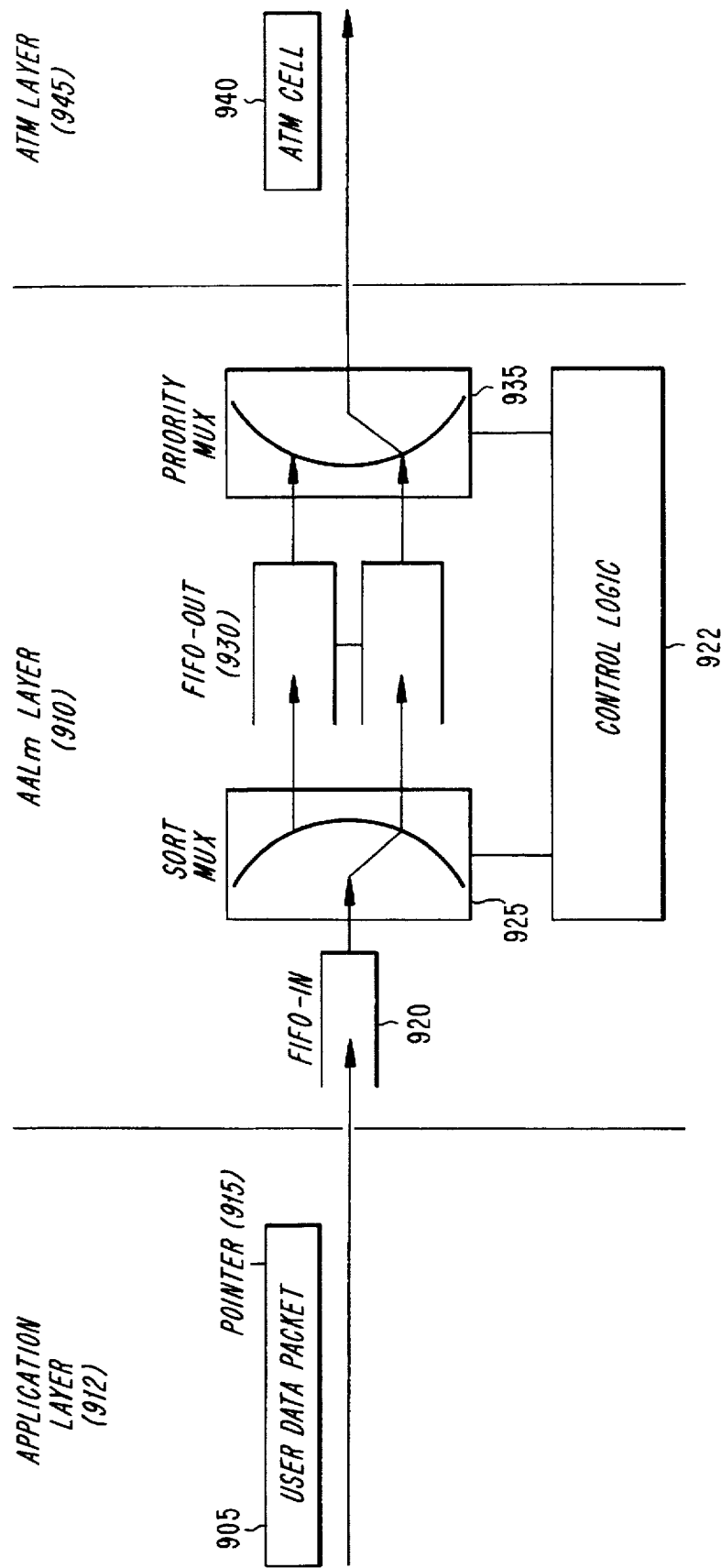
FIG. 9 illustrates an apparatus for segmenting and simultaneously multiplexing segment minicells.

FIG. 9 illustrates a simple block diagram of an apparatus 900 that may be used to implement the method described above. In accordance with FIG. 9, a user data packet 905 arrives at the AALm 910 from the application layer 912. Attached to the user data packet 905 is a user data packet pointer 915. The pointer 915 contains a number of bits which define the minicell connection identifier (CID) associated with the user data packet 905. For example, in a cellular telephone system, the CID may define a specific telephone call. The pointer 915 also defines the type of data contained in the user data packet 905 (e.g., voice data, circuit data, power measurement data, control data, etc.), which in turn defines the transmission priority for user data packet 905. The pointer 915 also defines the length of the user data packet 905.

At the AALm 910, a FIFO-IN 920 receives user data packet 905. In practice, FIFO-IN 920 will receive user data packets from many applications operating simultaneously. Once stored in FIFO-IN 920, the pointer is removed and analyzed by control logic 922. The sort multiplexer 925 then begins dividing the user data packet 905 into segments whose lengths are determined by control logic 922. The sort multiplexer 925 also pads the last segment of user data packet 905 and as directed by control logic 922. The segments are then assembled into minicells and the appropriate minicell headers are attached thereto (not shown). Sort multiplexer 925 then transfers the assembled minicells to the appropriate FIFO-OUT 930 as instructed by control logic 922 which determines the appropriate FIFO-OUT 930 based on the priority of the user data packet 905. Preferably, there will be a FIFO-OUT 930 for each transmission priority category.

The priority multiplexer 935 then selects minicells according to priority. More specifically, if a higher priority FIFO-OUT 930 contains minicells, priority multiplexer 935 will select these minicells and multiplex them into the payload of the current ATM cell 940. If the higher priority FIFO-OUT 930 is empty, the priority multiplexer 935 will move to the next highest FIFO-OUT 930 for minicells. The ATM layer 945 attaches an ATM header to each ATM cell payload before transmitting the ATM cell 940 to a receiving station (not shown).

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunication system, a method of multiplexing user data packets into a data stream prior to transmission from a sending station to a receiving station, the method comprising the steps of:

dividing a first user data packet into a first plurality of segments if the first user data packet is greater in length than a first predefined length, wherein the first user data packet has associated with it a first data type and a first transmission priority based on the first data type;

dividing a second user data packet into a second plurality of segments if the second user data packet is greater in length than the first predefined length, wherein the second user data packet has associated with it a second data type and a second transmission priority based on the second data type;

generating a minicell header for each segment associated with the first plurality of segments, wherein each minicell header contains a code which identifies the first data type, the first transmission priority, and a position of the corresponding segment in the first user data packet;

generating a minicell header for each segment associated with the second plurality of segments, wherein each minicell header contains a code which identifies the second data type, the second transmission priority, and a position of the corresponding segment in the second user data packet;

appending each minicell header to its corresponding segment to form a first plurality of minicells associated with the first user data packet and a second plurality of minicells associated with the second user data packet; and multiplexing the minicells associated with the first plurality of minicells and the minicells associated with the second plurality of minicells into the data stream, wherein the minicells associated with the first plurality of minicells and the minicells associated with the second plurality of minicells are interleaved relative to one another as a function of transmission priority.

2. The method of claim 1, wherein said step of dividing the first user data packet into the first plurality of segments and said step of dividing the second user data packet into the second plurality of segments each comprise the steps of:

dividing the corresponding user data packet into a first segment and a last segment, wherein the first segment has a length that is a select one of a number of predefined lengths reserved for the type of data associated with the corresponding user data packet; and if the length of the last segment is shorter than a select one of a number of predefined last segment lengths reserved for the data type associated with the corresponding user data packet, then extending the length of the last segment with a trailer field so that the length of the extended last segment equals the select one of the predefined last segment lengths.

3. The method of claim 1, wherein said step of dividing the first user data packet into a first plurality of segments and said step of dividing the second user data packet into a second plurality of segments each comprise the steps of:

dividing the corresponding user data packet into a first segment, at least one middle segment, and a last segment, wherein the first segment and the at least one middle segment each have a length that is a select one of a number of predefined lengths reserved for the type of data associated with the corresponding user data packet; and if the length of the last segment is shorter than a select one of a number of predefined last segment lengths reserved for the data type associated with the corresponding user data packet, then extending the length of the last segment with a trailer field so that the length of the extended last segment equals the select one of the predefined last segment lengths.

4. The method of claim 1 further comprising the steps of:
identifying the first or the second user data packet as a single segment if the length of the first or the second user data packet is less than the first predefined length, wherein said single segment is designated as a last segment; and if the length of the last segment is shorter than a select one of a number of predefined last segment lengths reserved for the data type associated with the corresponding user data packet, then extending the length of the last segment with a trailer field so that the length of the extended last segment equals the select one of the predefined last segment lengths.

5. In a telecommunication system, a method of multiplexing user data packets into a stream of data cells prior to transmission from a sending station to a receiving station, the method comprising the steps of:

retrieving a first user data packet from one of a select number of telecommunication applications serviced by said telecommunication system, wherein said telecommunication application generates a plurality of different data types;

dividing the first user data packet into segments according to the length and data type of the first user data packet;

generating a minicell corresponding to each segment by attaching a minicell header to each segment, wherein each minicell header contains a code that identifies the data type, a transmission priority associated with the data type, a length of the corresponding segment, and a position of the corresponding segment in the first user data packet; and multiplexing the minicells into the stream of data cells, wherein the stream of data cells contains minicells associated with a second user data packet, and wherein the order in which the minicells associated with the first user data packet and the second user data packets are multiplexed is a function of transmission priority.

6. The method of claim 5 further comprising the step of:
storing each of the minicells into a select one of a number of buffers in accordance with the transmission priority contained in the corresponding minicell header.

7. The method of claim 5 further comprising the step of:
multiplexing the minicells associated with the first and the second user data packets into the stream of data cells along with minicells associated with user data packets from other telecommunication applications serviced by the telecommunication system,
wherein the order in which the minicells are multiplexed is a function of transmission priority.

8. The method of claim 5, wherein said step of dividing the first user data packet into segments according to the length and data type of the first user data packet comprises the steps of:

dividing the first user data packet into a first segment and a last segment, wherein the first segment has a length that is a select one of a number of predefined lengths reserved for the data type associated with the first user data packet; and if the length of the last segment is shorter than a select one of a number of predefined last segment lengths reserved for the data type associated with the first user data packet, then extending the length of the last segment with a trailer field so that the length of the extended last segment equals the select one of the predefined last segment lengths.

9. The method of claim 5, wherein said step of dividing the first user data packet into segments according to the length and data type of the first user data packet comprises the steps of:

dividing the first user data packet into a first segment, at least one middle segment, and a last segment, wherein the first segment and the at least one middle segment each have a length that is a select one of a number of predefined lengths reserved for the data type associated with the first user data packet; and if the length of the last segment is shorter than a select one of a number of predefined last segment lengths reserved for the data type associated with the first user data packet, then extending the length of the last segment with a trailer field so that the length of the extended last segment equals the select one of the predefined last segment lengths.

10. The method of claim 5, wherein said step of dividing the first user data packet into segments according to the length and data type of the first user data packet comprises the steps of:

identifying the user data packet as a single segment if the length of the first user data packet is less than a predefined length, wherein said single segment is designated as a last segment; and if the length of the last segment is shorter than a select one of a number of predefined last segment lengths reserved for the data type associated with the first user data packet, then extending the length of the last segment with a trailer field so that the length of the extended last segment equals the select one of the predefined last segment lengths.

11. In a telecommunication system, an apparatus for multiplexing user data packets into a data stream prior to transmission from a sending station to a receiving station, the apparatus comprising:

first segmentation means for dividing a first user data packet into a first plurality of segments if the first user data packet is greater in length than a first predefined length, wherein the first user data packet has associated with it a first data type and a first transmission priority based on the first data type;

second segmentation means for dividing a second user data packet into a second plurality of segments if the second user data packet is greater in length than the first predefined length, wherein the second user data packet has associated with it a second data type and a second transmission priority based on the second data type;

means for generating a minicell header for each segment associated with the first plurality of segments, wherein each minicell header contains a code which identifies the first data type, the first transmission priority, and a position of the corresponding segment in the first user data packet;

means for generating a minicell header for each segment associated with the second plurality of segments, wherein each minicell header contains a code which identifies the second data type, the second transmission priority, and a position of the corresponding segment in the second user data packet;

assembly means for appending each minicell header to its corresponding segment to form a first plurality of minicells associated with the first user data packet and a second plurality of minicells associated with the second user data packet; and multiplexing means for inserting the minicells associated with the first plurality of minicells and the minicells associated with the second plurality of minicells into the data stream, wherein said minicells associated with the first plurality of minicells and the minicells associated with the second plurality of minicells are interleaved relative to one another as a function of transmission priority.

12. The apparatus of claim 11, wherein said first segmentation means for dividing the first user data packet into a first plurality of segments and said second segmentation means for dividing the second user data packet into the second plurality of segments each comprise:

means for dividing the corresponding user data packet into a first segment and a last segment, wherein the first segment has a length that is a select one of a number of predefined lengths reserved for the type of data associated with the user data packet; and means, responsive to the length of the last segment being shorter than a select one of a number of predefined last segment lengths reserved for the type of data associated with the corresponding user data packet, for extending the length of the last segment with a trailer field so that the length of the extended last segment equals the select one of the predefined last segment lengths.

13. The apparatus of claim 11, wherein said first segmentation means for dividing the first user data packet into a first plurality of segments and said second segmentation means for dividing the second user data packet into the second plurality of segments each comprise:

means for dividing the corresponding user data packet into a first segment, at least one middle segment, and a last segment, wherein the first segment and the at least one middle segment each have a length that is a select one of a number of predefined lengths reserved for the data type associated with the corresponding user data packet; and means, responsive to the length of the last segment being shorter than a select one of a number of predefined last segment lengths reserved for the data type associated with the corresponding user data packet, for extending the length of the last segment with a trailer field so that the length of the extended last segment equals the select one of the predefined last segment lengths.

14. The apparatus of claim 11, wherein said firs segmentation means for dividing the first user data packet into a first plurality of segments and said second segmentation means for dividing the second user data packet into the second plurality of segments each comprise:

means for identifying the first or the second user data packet as a single segment if the length of the first or the second user data packet is less than the first predefined length, wherein said single segment is designated as a last segment; and means, responsive to the length of the last segment being shorter than a select one of a number of predefined last segment lengths reserved for the data type associated with the corresponding user data packet, for extending the length of the last segment with a trailer field so that the length of the extended last segment equals the select one of the predefined last segment lengths.

15. In a telecommunication system, an apparatus for multiplexing user data packets into a stream of data cells prior to transmission from a sending station to a receiving station, the apparatus comprising:

means for retrieving a first user data packet from one of a select number of telecommunication applications serviced by said telecommunication system, wherein said telecommunication application generates a plurality of different data types;

segmentation means for dividing the first user data packet into segments according to the length and data type of the first user data packet;

assembly means for generating a minicell corresponding to each segment by attaching a minicell header to each segment, wherein each minicell header contains a code that identifies the data type, a transmission priority associated with the data type, a length of the corresponding segment, and a position of the corresponding segment in the first user data packet; and multiplexing means for inserting the minicells into the stream of data cells, wherein the stream of data cells contains minicells associated with a second user data packet, wherein the order in which the minicells associated with the first user data packet and the second user data packet are multiplexed is a function of transmission priority.

16. The apparatus of claim 15 further comprises:

means for storing each of the minicells into a select one of a number of buffers in accordance with the transmission priority contained in the corresponding minicell header.

17. The apparatus of claim 15 further comprises:

multiplexing means for inserting the minicells associated with the first and the second user data packets into the stream of data cells along with minicells associated with user data packets from other telecommunication applications serviced by the telecommunication system, wherein the order in which the minicells are multiplexed is a function of transmission priority.

18. The apparatus of claim 15, wherein said segmentation means for dividing the first user data packet into segments according to the length and data type of the first user data packet comprises:

means for dividing the first user data packet into a first segment and a last segment, wherein the first segment has a length that is a select one of a number of predefined lengths reserved for the data type associated with the first user data packet; and means, responsive to the length of the last segment being shorter than a select one of a number of predefined last segment lengths reserved for the data type associated with the first user data packet, for extending the length of the last segment with a trailer field so that the length of the extended last segment equals the select one of the predefined last segment lengths.

19. The apparatus of claim 15, wherein said segmentation means for dividing the first user data packet into segments according to the length and data type of the first user data packet comprises:

means for dividing the first user data packet into a first segment, at least one middle segment, and a last segment, wherein the first segment and the at least one middle segment each have a length that is a select one of a number of predefined lengths reserved for the data type associated with the firs user data packet; and means, responsive to the length of the last segment being shorter than a select one of a number of predefined last segment lengths reserved for the data type associated with the user data packet, for extending the length of the last segment with a trailer field so that the length of the extended last segment equals the select one of the predefined last segment lengths.

20. The apparatus of claim 15, wherein said segmentation means for dividing the first user data packet into segments according to the length and data type of the first user data packet comprises:

means for identifying the user data packet as a single segment if the length of the first user data packet is less than a predefined length, wherein said single segment is designated as a last segment; and means, responsive to the length of the last segment being shorter than a select one of a number of predefined last segment lengths reserved for the data type associated with the first user data packet, for extending the length of the last segment with a trailer field so that the length of the extended last segment equals the select one of the predefined last segment lengths.

* * * * *